(12) United States Patent
Liu (10) Patent No.: US 10,984,656 B2
(45) Date of Patent: Apr. 20, 2021

(54) METHOD FOR STOPPING A BICYCLE AT A CONTROLLED INTERSECTION, BICYCLE SYSTEM, AND BICYCLE

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Cheng-Xiang Liu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 248 days.

(21) Appl. No.: 16/373,112

(22) Filed: Apr. 2, 2019

(65) Prior Publication Data
US 2020/0273332 A1    Aug. 27, 2020

(30) Foreign Application Priority Data
Feb. 22, 2019  (CN) .......................... 201910133674.1

(51) Int. Cl.
| G08G 1/096 | (2006.01) |
| G08G 1/0967 | (2006.01) |
| B62J 99/00 | (2020.01) |
| B62L 3/00 | (2006.01) |
| B62L 1/00 | (2006.01) |
| B62J 45/20 | (2020.01) |

(52) U.S. Cl.
CPC ........ *G08G 1/096725* (2013.01); *B62J 99/00* (2013.01); *B62L 1/00* (2013.01); *B62L 3/00* (2013.01); *G08G 1/096775* (2013.01); *B62J 45/20* (2020.02)

(58) Field of Classification Search
CPC ......... G08G 1/096725; G08G 1/096775; B62J 99/00; B62L 1/00; B62L 3/00
See application file for complete search history.

(56) References Cited

U.S. PATENT DOCUMENTS

| 2015/0057869 A1* | 2/2015 | Healey | G06Q 50/30 |
| | | | 701/23 |
| 2016/0335892 A1* | 11/2016 | Okada | G08G 1/123 |
| 2017/0259753 A1* | 9/2017 | Meyhofer | H04N 13/204 |
| 2018/0061232 A1* | 3/2018 | Madigan | G08G 1/0112 |
| 2018/0233047 A1* | 8/2018 | Mandeville-Clarke | |
| | | | B60W 30/00 |
| 2019/0384292 A1* | 12/2019 | Aragon | G07C 5/02 |
| 2020/0273332 A1* | 8/2020 | Liu | B62L 3/00 |

* cited by examiner

*Primary Examiner* — Peter D Nolan
*Assistant Examiner* — Wae L Louie
(74) *Attorney, Agent, or Firm* — ScienBiziP, P.C.

(57) ABSTRACT

A method for stopping a bicycle at intersection, applied in a bicycle system including a signal light command device, a signal controller, an electromagnet emitting device, and a bicycle having a magnet adsorption device. The method includes controlling, by the signal controller, the electromagnet emitting device to generate magnetic attraction force when a stoplight of the signal light command device is turned on; and attracting, by the electromagnet emitting device, the magnet adsorption device of the bicycle to decelerate or stop the bicycle. A bicycle system and a bicycle are also provided.

19 Claims, 6 Drawing Sheets

METHOD FOR STOPPING A BICYCLE AT A CONTROLLED INTERSECTION, BICYCLE SYSTEM, AND BICYCLE

FIELD

The disclosure generally relates to road traffic safety.

BACKGROUND

Bicycles are part of urban traffic. More and more commuters are accustomed to riding bicycles, especially shared bicycles. However, traffic accidents can occur when a bicycle rider violet a stoplight. A method that can automatically stop a bicycle rider from crossing an intersection against a stoplight may reduce traffic accidents.

A method for stopping a bicycle may be achieved by installing a sensor which recognizes a red traffic light on the front of the bicycle. When the sensor recognizes a stoplight, the brake device of the bicycle is automatically activated. However, other traffic or other obstacles in front of the bicycle may obstruct the line of sight of the sensor.

BRIEF DESCRIPTION OF THE DRAWINGS

Implementations of the present technology will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to", it specifically indicates open-ended inclusion or membership in a so-described combination, group, series, and the like.

Figure 1:
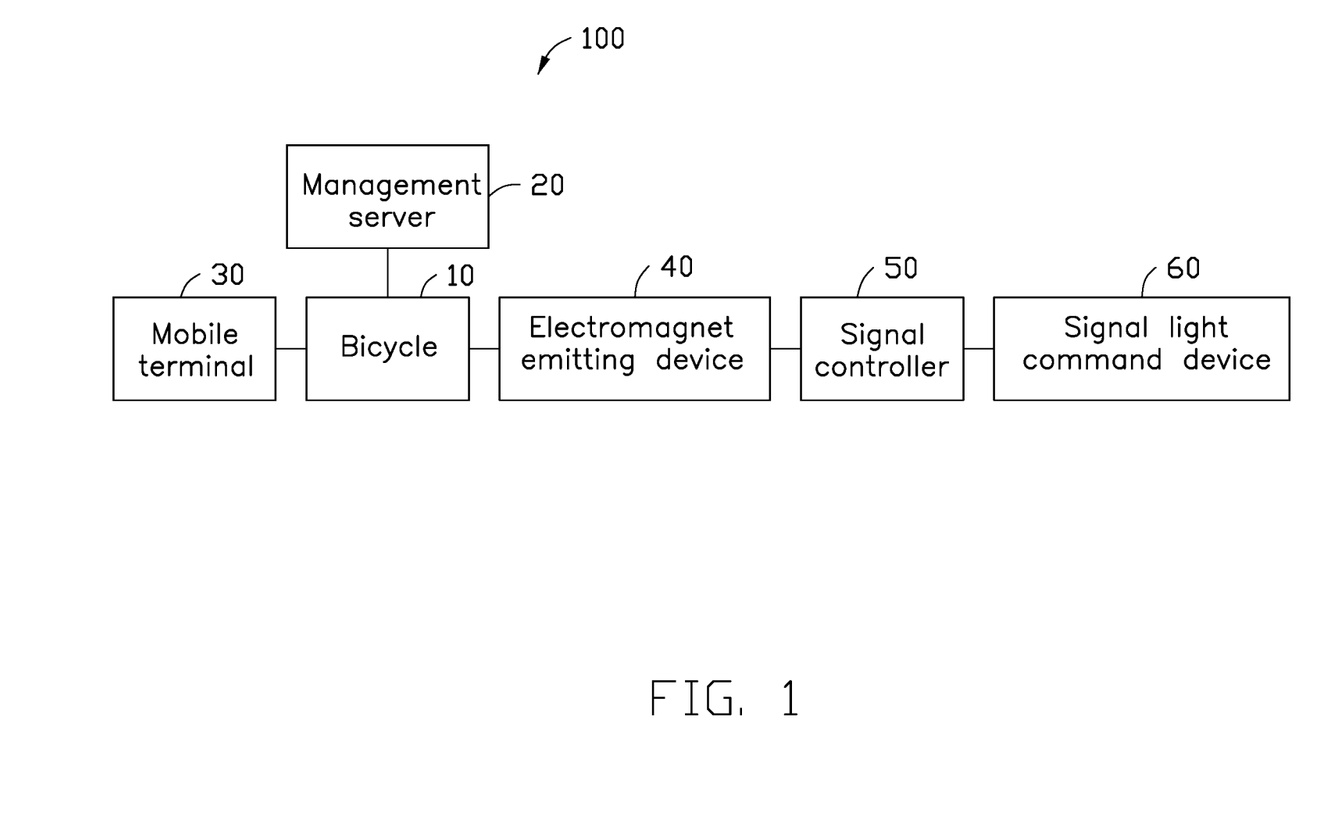
FIG. 1 is a schematic diagram of a bicycle system in accordance with an embodiment of the present disclosure.

FIG. 1 illustrates a bicycle system 100 of an embodiment of the present disclosure. The bicycle system 100 include a bicycle 10, a management server 20, a mobile terminal 30, an electromagnet emitting device 40, a signal controller 50, and a signal light command device 60. The mobile terminal 30 may be a mobile phone.

The bicycle 10 is in communication with the management server 20. When a two-dimensional code displayed on the bicycle 10 is scanned through an application (APP) installed in the mobile terminal 30, the mobile terminal 30 transmits the scanned information to the management server 20. The management server 20 can send an unlock signal to the bicycle 10 after receiving the scanned information transmitted by the mobile terminal 30. The bicycle 10 is unlocked after receiving the unlock signal.

The signal controller 50 controls the electromagnet emitting device 40 to turn on or off according to a signal light emitted from the signal light command device 60. In at least one embodiment, the signal controller 50 is electrically connected to the signal light command device 60 and the electromagnet emitting device 40. The signal light command device 60 can be positioned at a road intersection controlled by traffic lights and emits a stoplight (red light) or a golight (green light) to respectively prevent or allow the passage of pedestrians and vehicles crossing the intersection. The electromagnet emitting device 40 is disposed on a sidewalk near the intersection. When the electromagnet emitting device 40 is activated, the electromagnet emitting device 40 can generate a magnetic attraction force, thus the bicycle 10 traveled above the electromagnet emitting device 40 can be attracted by the electromagnet emitting device 40. When the signal light command device 60 emits the stoplight, the signal controller 50 receives a first command from the signal light command device 60, and controls the electromagnet emitting device 40 to turn on. When the signal light command device 60 emits the golight, the signal controller 50 receives a second command from the signal light command device 60, and controls the electromagnet emitting device 40 to turn off.

In other embodiments, the signal controller 50 may be electrically connected to the electromagnet emitting device 40. The signal controller 50 can sense the stoplight or golight from the signal light command device 60 and control the electromagnet emitting device 40. In one embodiment, the signal controller 50 may sense the stoplight or the golight with a camera.

Figure 2:
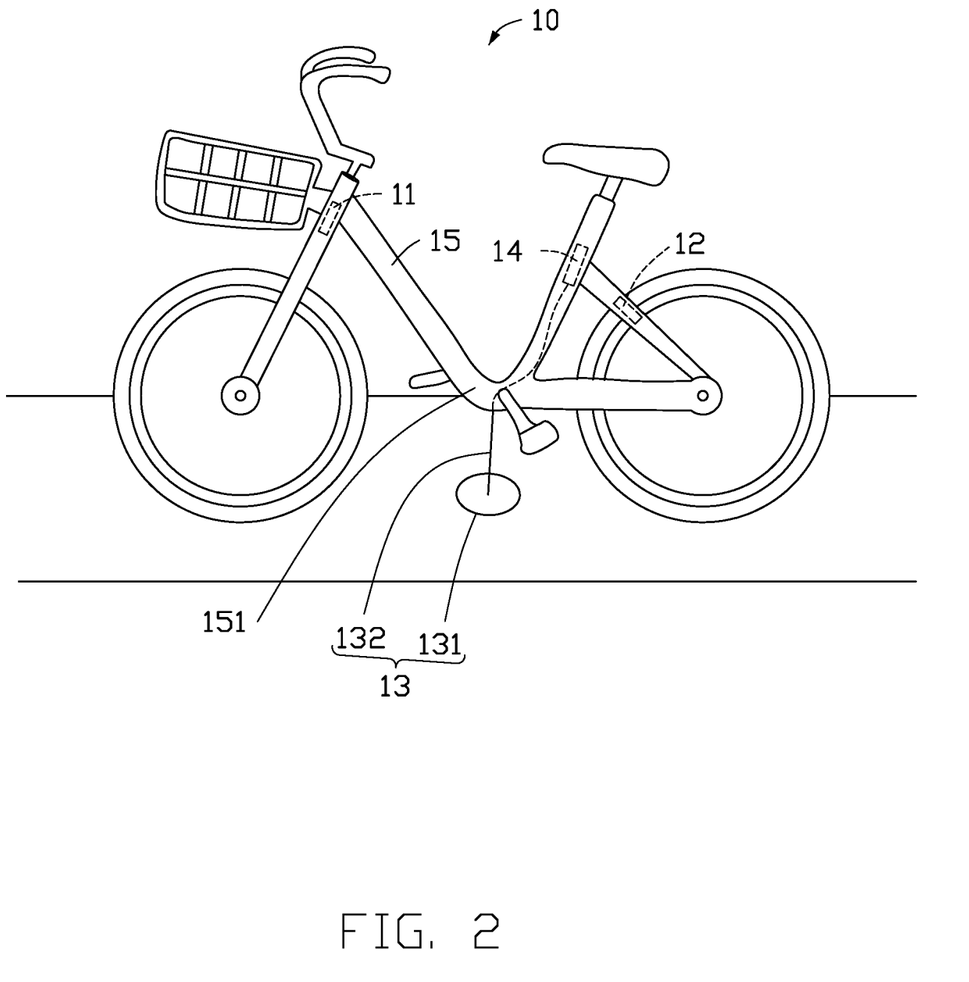
FIG. 2 is an isometric view of an embodiment of a bicycle.

FIG. 2 illustrates that the bicycle 10 can include a bicycle body 15, and a bicycle control device 11, a brake device 12, a magnet adsorption device 13, and a tension measuring device 14 mounted on the bicycle body 15.

The bicycle control device 11 can establish a communication with the mobile terminal 30, and/or the management server 20, and can control the brake device 12 and the tension measuring device 14.

The brake device 12 is configured to decelerate a wheel of the bicycle and lock the wheel against rotation. The brake device 12 can be mounted at a front wheel and/or a rear wheel of the bicycle 10.

The magnet adsorption device 13 can be disposed at a chassis 151 of the bicycle body 15, and can include a magnet suction plate 131 and a spring rope 132 connected to the magnet suction plate 131. The magnet suction plate 131 can be movably received in the bicycle body 15. The spring rope 132 has a certain elasticity. Preferably, the spring rope 132 can be a steel cord comprising a spring retractor (not shown). The magnet adsorption device 13 is configured to interact with a magnetic device. Preferably, a distance between the chassis of the bicycle body 15 and the road is about 20 cm, which ensures that the bicycle 10 can ride over an obstacle on road, while allowing the magnet adsorption device 13 to be easily triggered.

In normal conditions, the magnet suction plate 131 and the spring rope 132 are both received in the bicycle body 15. When the bicycle 10 is just above the magnetic device, the magnet suction plate 131 is adsorbed to the magnetic device, the spring rope 132 is elastically deformed and protrudes out of the bicycle body 15, and the magnet suction plate 131 is pulled out of the bicycle body 15 and adsorbed to the magnetic device. The bicycle 10 is decelerated or stopped, reminding the rider that the intersection should not be crossed at this time. In at least one embodiment, the magnetic device may be the electromagnet emitting device 40. If the magnetic attraction between the magnet adsorption device 13 and the magnetic device is strong, the bicycle 10 can be automatically stopped.

Figure 3:
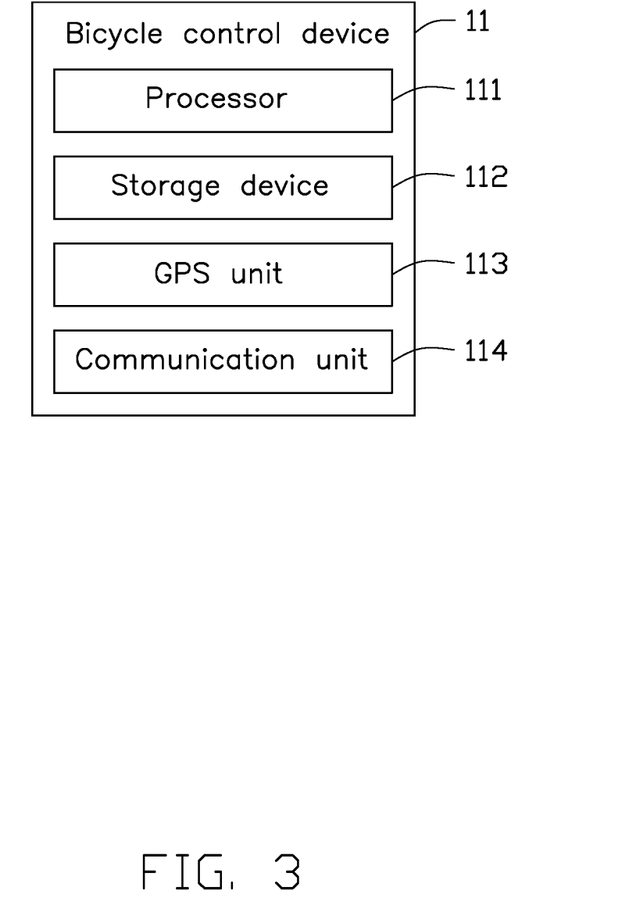
FIG. 3 is a schematic diagram of an embodiment of a bicycle control device.

FIG. 3 illustrates a bicycle control device 11 of an embodiment of the present disclosure. The bicycle control device 11 may include a processor 111, a storage device 112, a GPS unit 113, and a commutation unit 114. Each of the storage device 112, the GPS unit 113, and the commutation unit 114 may be electrically connected to the processor 111.

The processor 111 may be composed of integrated circuits. For example, the processor 10 may be composed of a single integrated circuit, or may be composed of multiple integrated circuits of the same function or different functions. The processor 10 may include one or more central processors (Central Processing unit (CPU)), a microprocessor, a digital processing chip, a graphics processor, or a combination of various control chips.

The storage device 112 stores data and code in the bicycle control device 11. The storage device 112 may be, but is not limited to, read-only memory (ROM), random-access memory (RAM), erasable programmable ROM (EPROM), electrically EPROM (EEPROM), hard disk, solid state drive, or other forms of electronic, electromagnetic, or optical recording medium.

The GPS unit 113 is configured to acquire the position of the bicycle 10 in real time.

The communication unit 114 can establish a communication with the mobile terminal 30, and/or the management server 20. In this embodiment, the communication unit 114 may be a WIFI module, a GSM module, a BLUETOOTH module, or the like.

Figure 4:
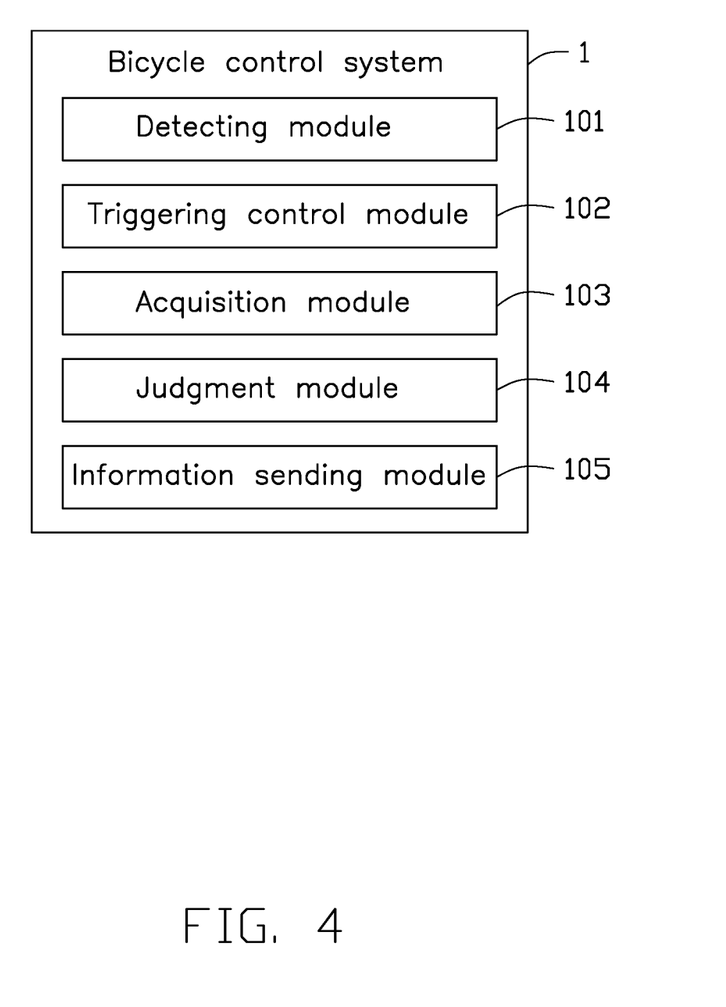
FIG. 4 is a schematic diagram of another embodiment of a bicycle control system.

FIG. 4 shows a bicycle control system 1. The bicycle control system 1 may include serval modules, which are a collection of software instructions stored in the storage device 112 and are executed by the processor 111. In the embodiment as disclosed, the bicycle control system 2 may include a detecting module 101, a triggering control module 102, an acquisition module 103, a judgment module 104, and an information sending module 105.

The detecting module 101 can detect if and when the magnet adsorption device 13 is adsorbed by the magnetic device. In at least one embodiment, the detecting module 101 is configured to detect whether the magnet adsorption device 13 is adsorbed by the electromagnet emitting device 40 on the road.

The triggering control module 102 can trigger the brake device 12 and the tension measuring device 14. In the embodiment, the triggering control module 102 is configured to activate the brake device 12 when the detecting module 101 detects that the magnet adsorption device 13 has been adsorbed, and control the tension measuring device 14 to measure a pulling force applied to the magnet suction plate 131. The triggering control module 102 is further configured to control the brake device 12 to unlock the wheel when the detecting module 101 detects that the magnet adsorption device 13 is no longer attracted, and control the tension measuring device 14 to finish the measurement.

The acquisition module 103 is configured to acquire the pulling force applied to the magnet suction plate 131. The pulling force can be measured by the tension measuring device 14.

The judgment module 104 is configured to determine whether the pulling force applied to the magnet suction plate 131 exceeds a preset threshold.

The information sending module 105 is configured to send information to the management server 20 when the pulling force exceeds the preset threshold. The management server 20 can record the number of instances when the pulling force exceeds the preset threshold as violations to the account of the rider, and send a reminder to the mobile terminal 30.

Figure 5:
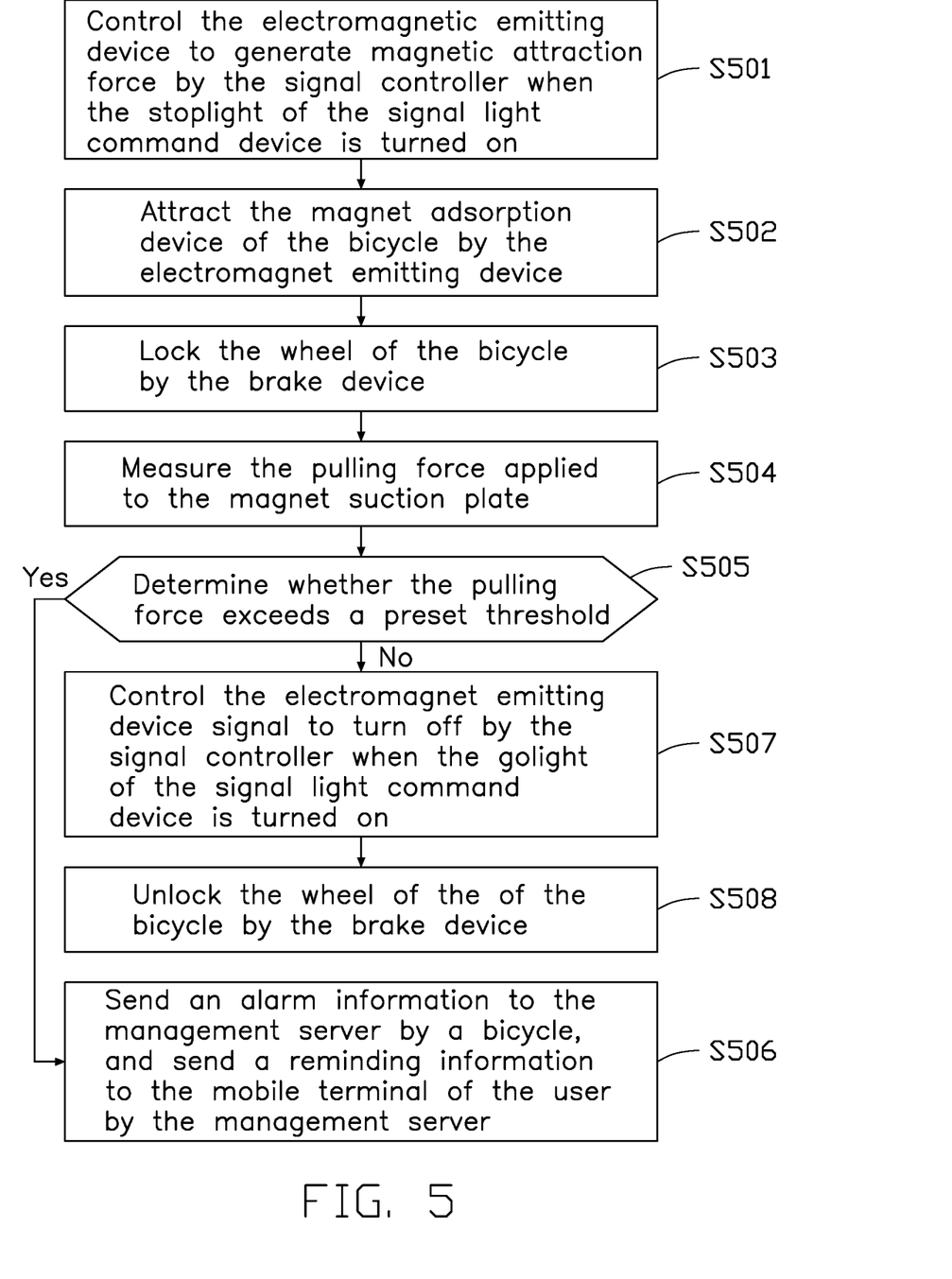
FIG. 5 is a flow chart of an embodiment of a method for stopping a bicycle at an intersection.

A method for stopping the bicycle at an intersection is illustrated in FIG. 5. The method is provided by way of embodiments, as there are a variety of ways to carry out the method. Each block shown in FIG. 5 represents one or more processes, methods, or subroutines carried out in the example method. Additionally, the illustrated order of blocks is by example only and the order of the blocks can be changed. The method can begin at block S501.

At block S501, the stoplight of the signal light command device 60 is turned on, the signal controller 50 controls the electromagnet emitting device 40 at the intersection to be turned on, and the electromagnet emitting device 40 generates a magnetic attraction force.

In at least one embodiment, when the stoplight is turned on, the signal command device 60 sends a first command to the signal controller 50. The signal controller 50 controls the electromagnet emitting device 40 to be turned on after receiving the first command. In other embodiments, the signal controller 50 controls the electromagnet emitting device 40 to be turned on after detecting that the stoplight is turned on by the camera.

At block S502, the magnet adsorption device 13 is attracted by the electromagnet emitting device 40.

The magnet suction plate 131 of the magnet adsorption device 13 is adsorbed to the road on which the electromagnet emitting device 40 is mounted, and the spring rope 132 is elastically deformed, so that the bicycle 10 is decelerated or stopped, and the rider is reminded that the intersection at this time cannot be crossed.

At block S503, the brake device 12 locks the wheel of the bicycle 10.

When the bicycle 10 detects that the magnet adsorption device 13 has been attracted by electromagnet emitting device 40, the brake device 12 is activated to automatically lock the wheel, thereby further ensuring that the bicycle 10 is stopped, and the rider is prevented from riding the bicycle 10.

At block S504, the tension measuring device 14 of the bicycle 10 measures the pulling force applied to the magnet suction plate 131.

At block S505, whether the pulling force exceeds a preset threshold is determined.

The bicycle 10 may be forcibly pushed such that the bicycle 10 breaks free of the adsorption force of the electromagnet emitting device 40. In such a situation, the pulling force applied to the magnet suction plate 131 is large, and may exceed the preset threshold. If the pulling force exceeds the preset threshold, the process goes to block S506; otherwise, the process goes to step S507.

At block S506, the bicycle 10 sends an alarm information to the management server 20, the management server 20 records the number of instances of the pulling force exceeds the present threshold as violations of the account of the rider, and sends a reminding information to the mobile terminal 30.

In other embodiments, the bicycle 10 can directly send the alarm information to the mobile terminal 30, and the mobile terminal 30 can send the alarm information to the management server 20. If the number violations are more than three times, the management server 20 may cancel the rider's access rights of the bicycles 10.

At block S507, the golight of the signal light command device 60 is turned on, and the signal controller 50 controls the electromagnet emitting device 40 to be turned off. The electromagnet emitting device 40 no longer adsorbs the magnet adsorbing device 13 of the bicycle 10.

In at least one embodiment, the signal light command device 60 sends a second command to the signal controller 50 to control the electromagnet emitting device 40 to be turned off. In other embodiments, the signal controller 50 control the electromagnet emitting device 40 to be turned off after detecting that the golight in turned on.

At block S508, the brake device 12 unlocks the wheel.

The tension measuring device 14 can measure the pulling force applied to the bicycle 10, and the detecting module 101 can detect whether the bicycle 10 is attracted by the electromagnet emitting device 40. After the bicycle 10 detects that the magnet adsorbing device 13 is no longer be attracted, the bicycle 10 controls the brake device 12 to unlock the wheel.

In other embodiments, the processes at block S504, S505, and S506 can be omitted according to actual needs.

In other embodiments, the processes at block S503 and S508 can be omitted. The bicycle can be decelerated and stopped by the adsorption force between the magnet adsorption device 13 and the electromagnet emitting device 40.

Figure 6:
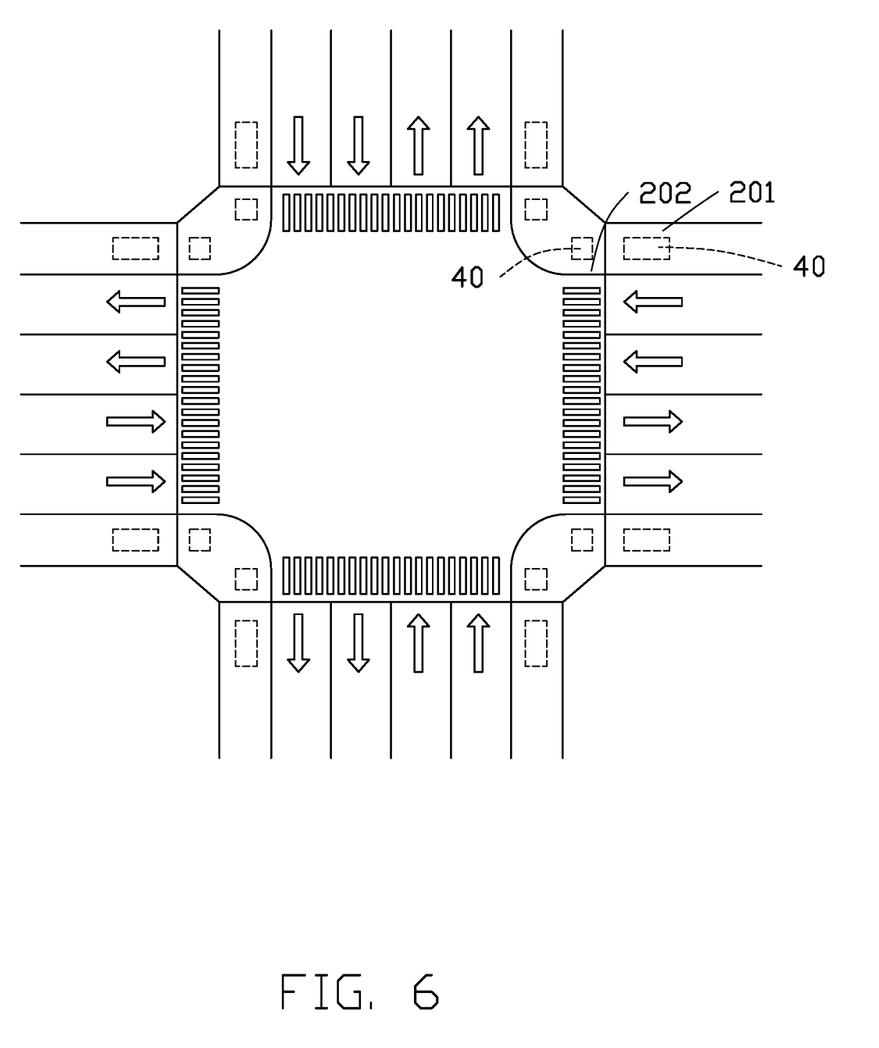
FIG. 6 is an isometric view of an embodiment of an intersection.

FIG. 6 illustrates an embodiment of an intersection of the present disclosure. A first electromagnetic railway surface 201 is the sidewalk adjacent to the intersection. A second electromagnetic railway surface 202 is the sidewalk adjacent to pedestrian crossing (zebra crossing). The first electromagnetic railway surface 201 and the second electromagnetic railway surface 202 are provided with the electromagnet emitting devices 40. When the stoplight at the intersection is turned on, the signal controller 50 controls the first electromagnetic railway surface 201 to be turned on immediately, and controls the second electromagnetic railway surface 203 to be turned on after a predetermined time (e.g. 5 seconds). Therefore, the bicycle 10 rid on the first electromagnetic railway surface 201 is stopped immediately, and the bicycle 10 rid on the second electromagnetic railway surface 203 can pass the intersection as soon as possible to avoid obstructing traffic.

In other embodiments, the number and the positions of the electromagnet emitting devices 40 can be set according to the requirements, and at least one electromagnet emitting device 40 can be disposed at the sidewalk of each intersection.

The bicycle system 100 can control the bicycle 10 to decelerate or stop when the stoplight at the intersection is turned on, and prevent the rider from forcibly passing the intersection, thereby avoiding the traffic accident caused by the bicycle 10. The signal controller 50 can be electrically connected to the signal light command device 60 and the electromagnet emitting device 40, and the signal controller 50 can control the electromagnet emitting device 40 after receiving the command from the signal light command device 60. Therefore, the bicycle system 100 can avoid the impact of rain or obstacles in rainy weather, and can accurately control the electromagnet emitting device 40. The bicycle system 100 has a high reliability and a strong anti-interference ability.

Furthermore, the bicycle system 100 can measure the pulling force applied to the magnet suction plate 131, and sends the alarm signal to the management server 20 when the pulling force exceeds the preset threshold. The management server 20 can accord the number of violations of the account of the user, and sends a reminding information to the mobile terminal 30 of the user.

In other embodiments, the magnet adsorption device 13 can be adsorbed with other magnetic devices to automatically decelerate or stop the bicycle 10.

A person skilled in the art can understand that all or part of the process in the above embodiments can be implemented by a computer program to instruct related hardware, and that the program can be stored in a computer readable storage medium. When the program is executed, a flow of an embodiment of the methods as described above may be included.

In addition, each functional unit in each embodiment of the present invention may be integrated in one processor, or each unit may exist physically separately, or two or more units may be integrated in one same unit. The above integrated unit can be implemented in the form of hardware or in the form of hardware plus software function modules.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. A method for stopping a bicycle at an intersection, applied in a bicycle system comprising a signal light command device, a signal controller, an electromagnet emitting device, and a bicycle comprising a magnet adsorption device, the method comprising:
   controlling, by the signal controller, the electromagnet emitting device to generate magnetic attraction force when a stoplight of the signal light command device is turned on;
   attracting, by the electromagnet emitting device, the magnet adsorption device of the bicycle to decelerate or stop the bicycle.

2. The method of claim 1 further comprising, after attracting the magnet adsorption device of the bicycle:
   activating a brake device of the bicycle to lock a wheel of the bicycle.

3. The method of claim 1, wherein the magnet adsorption device comprises a magnet suction plate and a spring rope connected to the magnet suction plate, the bicycle further comprises a tension measuring device connected to the spring rope; after attracting the magnet adsorption device of the bicycle, the method further comprises:
   measuring a pulling force applied to the magnet suction plate; and
   determining whether the pulling force exceeds a preset threshold.

4. The method of claim 3, wherein the bicycle system further comprises a management server and a mobile terminal, the method further comprises:

sending an alarm information to the management server by the bicycle when the pulling force exceeds the preset threshold;
recording a number of instances when the pulling force exceeds the preset threshold as violations of a rider and sending a reminding information to the mobile terminal by the management server.

5. The method of claim 1, wherein the method further comprises:
controlling, by the signal controller, to turn off the electromagnet emitting device when a golight of the signal light command device is turned on.

6. The method of claim 1, wherein when the stoplight is turned on, the signal light command device sends a command to the signal controller, and the signal controller controls the electromagnet emitting device to be turned on after receiving the command.

7. A bicycle system, comprising:
a bicycle comprising a magnet adsorption device;
a signal controller;
an electromagnet emitting device electrically connected to the signal controller;
wherein the signal controller is configured to control the electromagnet emitting device to generate magnetic attraction force when a stoplight at an intersection is turned on; and
wherein the magnet adsorption device of the bicycle is configured to be attracted by the electromagnet emitting device to decelerate or stop the bicycle.

8. The bicycle system of claim 7, wherein the bicycle further comprises a brake device, and the brake device is configured to lock a wheel of the bicycle after the magnet adsorption device of the bicycle is attracted by the electromagnet emitting device.

9. The bicycle system of claim 8, wherein the magnet adsorption device comprises a magnet suction plate and a spring rope connected to the magnet suction plate, and
wherein the bicycle further comprises a tension measuring device connected to the spring rope, and the tension measuring device is configured to measure a pulling force applied to the magnet suction plate after the magnet adsorption device is attracted.

10. The bicycle system of claim 9, wherein the bicycle further comprises a bicycle control device in communication with a management server, the bicycle control device comprises:
a processor; and
a storage device storing one or more programs, when executed by the processor, the one or more programs causing the processor to:
detect whether the magnet adsorption device is attracted by a magnetic device; and
control the brake device to brake when the magnet adsorption device has been attracted.

11. The bicycle system of claim 10, wherein the one or more programs further cause the processor to:
acquire the pulling force applied to the magnet suction plate;
determine whether the pulling force applied to the magnet suction plate exceeds a preset threshold; and
send an alarm information to the management server when the pulling force exceeds the preset threshold.

12. The bicycle system of claim 11, wherein the bicycle system further comprises a management server and a mobile terminal, and the management server is configured to record a number of instances when the pulling force exceeds the preset threshold as violations of a rider and send a reminding information to the mobile terminal.

13. The bicycle system of claim 7, wherein the bicycle system further comprises a signal light command device, and the signal light command device is electrically connected to the signal controller and configured to send a command to the signal controller when the stoplight is turned on.

14. The bicycle system of claim 7, wherein the signal controller is further configured to control the electromagnet emitting device to turn off when a golight is turned on.

15. A bicycle, comprising:
a bicycle body;
a bicycle control device in communication with a management server; and
a magnet adsorption device configured to adsorb with a magnetic device;
wherein the magnet adsorption device comprises a magnet suction plate and a spring rope connected to the magnet suction plate, and the magnet suction plate is movably received in the bicycle body;
wherein when the bicycle travels above the magnetic device, the magnet suction plate is attracted by the magnetic device, the spring rope is elastically deformed and protrudes out of the bicycle body, and the magnet suction plate is pulled out of the bicycle body and attracted by the magnetic device to decelerate or stop the bicycle.

16. The bicycle of claim 15, wherein the bicycle further comprises a tension measuring device connected to the spring rope, and the tension measuring device is configured to measure a pulling force applied to the magnet suction plate after the magnet adsorption device is attracted by the magnetic device.

17. The bicycle of claim 16, wherein bicycle further comprises a brake device, and the brake device is configured to lock a wheel of the bicycle after the magnet adsorption device of the bicycle is attracted by the magnetic device.

18. The bicycle of claim 17, wherein the bicycle control device comprises:
a processor; and
a storage device storing one or more programs, when executed by the processor, the one or more programs causing the processor to:
detect whether the magnet adsorption device is attracted by the magnetic device; and
control the brake device to brake when the magnet adsorption device has been attracted.

19. The bicycle of claim 18, wherein the one or more programs further cause the processor to:
acquire the pulling force applied to the magnet suction plate;
determine whether the pulling force applied to the magnet suction plate exceeds a preset threshold; and
send an information to the management server when the pulling force exceeds the preset threshold.

* * * * *